United States Patent
Zhang

(10) Patent No.: US 11,856,575 B2
(45) Date of Patent: Dec. 26, 2023

(54) METHOD AND DEVICE USED FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 375 days.

(21) Appl. No.: 17/187,807

(22) Filed: Feb. 28, 2021

(65) Prior Publication Data

US 2021/0219319 A1 Jul. 15, 2021

Related U.S. Application Data

(63) Continuation of application No. PCT/CN2020/141463, filed on Dec. 30, 2020.

(30) Foreign Application Priority Data

Jan. 13, 2020 (CN) .......................... 202010029367.1

(51) Int. Cl.
| | |
|---|---|
| *H04W 72/1273* | (2023.01) |
| *H04W 72/0446* | (2023.01) |
| *H04W 74/08* | (2009.01) |
| *H04W 76/27* | (2018.01) |
| *H04W 72/50* | (2023.01) |

(52) U.S. Cl.
CPC ... *H04W 72/1273* (2013.01); *H04W 72/0446* (2013.01); *H04W 72/535* (2023.01); *H04W 74/0833* (2013.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2021/0007149 | A1* | 1/2021 | Li | H04L 27/0006 |
| 2021/0092759 | A1* | 3/2021 | Xiong | H04L 1/1854 |
| 2022/0095332 | A1* | 3/2022 | Li | H04W 72/23 |
| 2022/0131645 | A1* | 4/2022 | Miao | H04L 1/08 |
| 2022/0166586 | A1* | 5/2022 | Kundu | H04L 27/0006 |
| 2022/0190886 | A1* | 6/2022 | Islam | H04W 72/1268 |
| 2022/0191916 | A1* | 6/2022 | Talarico | H04L 1/1614 |
| 2022/0312481 | A1* | 9/2022 | Talarico | H04W 72/0446 |

* cited by examiner

*Primary Examiner* — Anh Vu H Ly

(57) ABSTRACT

The present disclosure provides a method and device for wireless communications, comprising receiving a first signaling and transmitting a first signal; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time; a first time window and a second time window are reasonably configured in the present disclosure and are associated with a Protocol Data Unit (PDU) session, increasing the flexibility of the system.

20 Claims, 7 Drawing Sheets

K1 time-frequency resource set(s)
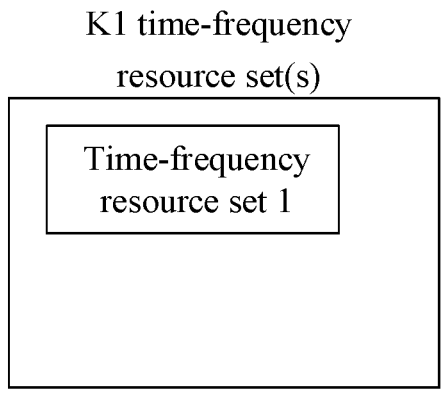
FIG. 8
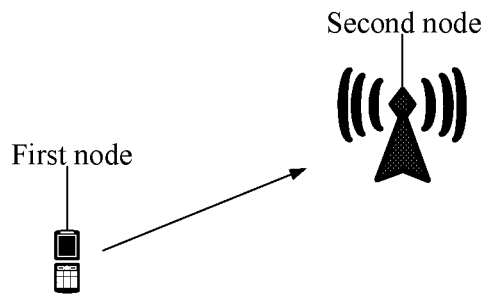
FIG. 9
Second node
First node     Third node
FIG. 10
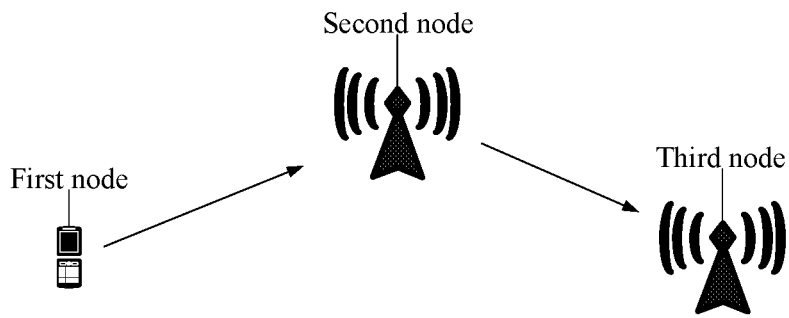
FIG. 11

Whether third signaling being used for determining first time window set —being used for determining→ whether third signal being used for determining second time window set
FIG. 12
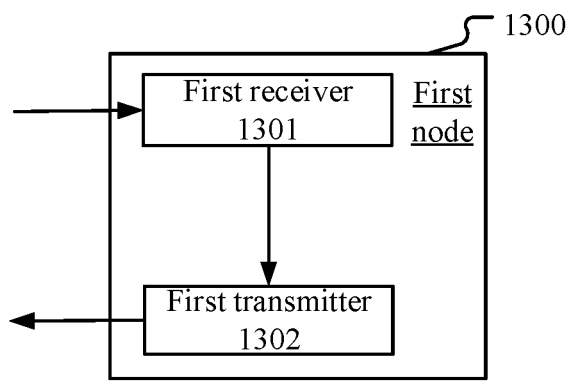
FIG. 13
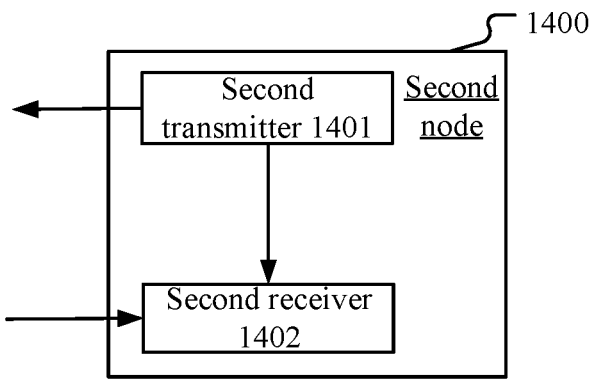
FIG. 14

METHOD AND DEVICE USED FOR WIRELESS COMMUNICATION

CROSS REFERENCE TO RELATED APPLICATIONS

This application is a continuation of International Application No. PCT/CN2020/141463, filed Dec. 30, 2020, claims the priority benefit of Chinese Patent Application No. 202010029367.1, filed on Jan. 13, 2020, the full disclosure of which is incorporated herein by reference.

BACKGROUND

Technical Field

The present disclosure relates to transmission methods and devices in wireless communication systems, and in particular to a transmission method and device related to improving resource utilization efficiency and system flexibility in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In communications, Long Term Evolution (LTE) and 5G NR both involve features of reliable system access, flexible resource allocation, scalable system structure and efficient session management, which are of great significance to maintenance of normal communications between a base station and a UE, reasonable scheduling of resources and balancing of system payload. Those features can be called cornerstones of high throughout and are characterized in meeting communication requirements of various traffic and improving spectrum utilization efficiency, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Network (NTN) and Territorial Network (TN), as well as in the mixture of the above communication modes, there are extensive requirements in radio resource management and in multi-antenna codebook selection.

With the increase of scenarios and complexity of systems, higher requirements are put forward to reduce delay, enhance reliability and system stability, provide flexibility to traffic and save power. At the same time, compatibility between different versions of different systems should be considered when designing the systems.

SUMMARY

In multiple communication scenarios, network is required to be accessed when a user needs to initiate communications. After accessing the network, resources are requested from the network when a user needs to transmit data; while parameters involved in a session, such as Quality of Service (QoS) parameters, are mainly related to rate and delay. The present system cannot provide adequate support for characteristics of the session itself, and resource scheduling does not consider time characteristics when user traffic data occurs, which reduces flexibility of system and efficiency of resource utilization. The existing design results in decreased resource efficiency, hard-guaranteed communication quality, node's failure in establishing effective communication bearers as well as various chaos. On the other hand, the current communication system, especially in transmission of small data, has a relatively large signaling overhead, which brings dual problems in resource utilization efficiency and power consumption, especially for IoT users. The problems also have a certain impact on network with a large propagation delay. Since a user experiences a long delay in each signaling process, reducing signaling as much as possible is very beneficial to system communications. Besides, various communication scenarios may be mixed together, which also brings problems for the design of the system.

In view of the above problem, the present disclosure provides a solution.

It should be noted that the embodiments of any node in the present disclosure and the characteristics of the embodiments may be applied to any other node if no conflict is incurred. The embodiments of the present disclosure and the characteristics of the embodiments may be mutually combined if no conflict is incurred. In addition, it should be noted that in the description of the above problems, IoT scenario is only an example of application scenarios of the scheme provided in the present disclosure; the present disclosure is also applicable to scenarios such as NTN to achieve similar technical effects in the IoT scenario. Similarly, the present disclosure is also applicable to scenarios with Unmanned Aerial Vehicle (UAV) or In-Vehicle Network (IVN) to achieve similar technical effects in the IoT scenario. In addition, a unified solution for different scenarios (including but not limited to NTN and TN scenarios) can also help reduce hardware complexity and cost.

The present disclosure provides a method in a first node for wireless communications, comprising:

receiving a first signaling; and transmitting a first signal;
herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to a Radio Resource Control (RRC) state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

In one embodiment, a problem to be solved in the present disclosure comprises: the lack of support for time characteristics of session and traffic in user session management leads to flexibility deficiency and non-ideal resource utilization efficiency of the system. The above method properly designs a first time window and a second time window, associates them with corresponding data radio bearers, and provides support of time-dimension information for users' session, resource requesting and resource scheduling, thus solving the above problem.

In one embodiment, the above method is characterized in that the first signaling comprises a System Information Block (SIB), and the first signaling is transmitted on a Physical Downlink Shared Channel (PDSCH).

In one embodiment, the above method is characterized in that the first signaling comprises an RRC signaling, and the first signaling is transmitted on a Physical Downlink Shared Channel (PDSCH).

In one embodiment, the above method is characterized in that the first data radio bearer group at least comprises a Data Radio Bearer (DRB).

In one embodiment, the above method is characterized in that the first data radio bearer group comprises an only DRB of the first node.

In one embodiment, the above method is characterized in that the first data radio bearer group comprises all DRBs of the first node.

In one embodiment, the above method is characterized in that the first data radio bearer group comprises all Radio Bearers (RBs) of the first node.

In one embodiment, the above method is characterized in that the first data radio bearer group comprises all RBs of the first node for bearing traffic data.

In one embodiment, the above method is characterized in that the first data radio bearer group comprises a DRB of the first node associated with a QoS flow.

In one embodiment, the above method is characterized in that the first data radio bearer group comprises all RBs of the first node for bearing Non-Access Stratum (NAS) data.

In one embodiment, the above method is characterized in that the first data radio bearer group comprises a first DRB after the first node is powered on.

In one embodiment, the above method is characterized in that the first data radio bearer group comprises a DRB of the first node for bearing data that triggers random access.

In one embodiment, the above method is characterized in that the first data radio bearer group comprises a DRB of the first node that needs to applied to be scheduled.

In one embodiment, the above method is characterized in that the RRC state is an RRC state.

In one embodiment, the above method is characterized in that the RRC state comprises an RRC connected state.

In one embodiment, the above method is characterized in that the RRC state comprises an RRC idle state.

In one embodiment, the above method is characterized in that the RRC state comprises an RRC inactive state.

In one embodiment, the above method is characterized in that the scheduling request comprises transmitting a Scheduling Request (SR) signaling.

In one embodiment, the above method is characterized in that the scheduling request comprises transmitting Buffer Status Report (BSR) information.

In one embodiment, the above method is characterized in that the scheduling request comprises transmitting an RRC signaling.

In one embodiment, the above method is characterized in that the scheduling request signaling is transmitted on a Physical Uplink Control Channel (PUCCH).

In one embodiment, the above method is characterized in that the scheduling request signaling is transmitted on a Physical Uplink Shared Channel (PUSCH).

In one embodiment, the above method is characterized in that the scheduling request signaling is transmitted on a Physical Random Access Channel (PRACH).

In one embodiment, the above method is characterized in that the resource allocation comprises a Resource Allocation (RA).

In one embodiment, the above method is characterized in that the resource allocation is transmitted via a Downlink Control Information (DCI) signaling.

In one embodiment, the above method is characterized in that the resource allocation is transmitted via a Medium Access Control Control Element (MAC CE) signaling.

In one embodiment, the above method is characterized in that the resource allocation is transmitted on a Physical Downlink Shared Channel (PDSCH).

In one embodiment, the above method is characterized in that the resource allocation is transmitted on a Physical Downlink Control Channel (PDCCH).

In one embodiment, the above method is characterized in that the phrase in a communication process comprises:

In one embodiment, the a communication process comprises a communication between the first node and a serving cell of the first node;

In one embodiment, the a communication process comprises completion of data transmission in buffer zone associated with the first data radio bearer group;

In one embodiment, the a communication process comprises a communication process of the first data radio bearer group from being established to being released;

In one embodiment, the a communication process occurs in a same Protocol Data Unit (PDU) Session;

In one embodiment, the a communication process occurs in a random access process;

In one embodiment, the a communication process occurs in a data transmission process after random access and before a next random access process;

In one embodiment, the a communication process occurs in a same RRC state;

In one embodiment, the a communication process occurs after other one RRC state switches into a current RRC state and before the current RRC state switches into a RRC state different from the current RRC state;

In one embodiment, the a communication process occurs when the first node enters into an RRC connected state and an RRC connection is not released;

In one embodiment, the a communication process occurs after a PDU session is established and before the PDU session is released;

In one embodiment, the a communication process occurs when a PDU session is in Active state and before the PDU session enters into a state other than the Active state;

In one embodiment, the a communication process occurs after the first node is powered on and before next shutdown.

In one embodiment, the above method is characterized in that the first time length comprises a positive integer number of OFDM symbol(s).

In one embodiment, the above method is characterized in that the first time length comprises a positive integer number of slot(s).

In one embodiment, the above method is characterized in that the first time length comprises a positive integer number of subframe(s).

In one embodiment, the above method is characterized in that the first time length comprises a positive integer number of frame(s).

In one embodiment, the above method is characterized in that the first time length comprises a positive integer number of superframe(s).

In one embodiment, the above method is characterized in that the first time length comprises a positive integer number of ms(s).

In one embodiment, the above method is characterized in that the first time length comprises a positive integer number of second(s).

In one embodiment, the above method is characterized in that the first time length comprises a positive integer number of minute(s).

In one embodiment, the above method is characterized in that the first time length comprises a positive integer number of hour(s).

In one embodiment, the above method is characterized in that the first time length comprises a positive integer number of system message modification period(s).

In one embodiment, the above method is characterized in that the first time length comprises a positive integer number of Round Trip Time(s)(RTT).

In one embodiment, the above method is characterized in that the first time length comprises a positive integer number of Discontinuous Reception (DRX) period(s).

In one embodiment, the above method is characterized in that the first time is related to a DRX period.

In one embodiment, the above method is characterized in that the first time is related to a system message modification period.

In one embodiment, the above method is characterized in that the first time is related to a paging period.

In one embodiment, the above method is characterized in that the first time is related to an RTT.

In one embodiment, the above method is characterized in that the first specific time comprises a time for transmitting the first signaling.

In one embodiment, the above method is characterized in that the first specific time comprises a time for transmitting the first signaling plus a time offset.

In one embodiment, the above method is characterized in that the first specific time comprises a time for receiving the first signaling.

In one embodiment, the above method is characterized in that the first specific time comprises a time for receiving the first signaling plus a time offset.

In one embodiment, the above method is characterized in that the first specific time comprises a time for receiving the first signal.

In one embodiment, the above method is characterized in that the first specific time comprises a time for receiving the first signal plus a time offset.

In one embodiment, the above method is characterized in that the first specific time comprises a time for transmitting the first signal.

In one embodiment, the above method is characterized in that the first specific time comprises a time for transmitting the first signal plus a time offset.

In one embodiment, the above method is characterized in that the first specific time comprises a positive-integer-th subframe.

In one embodiment, the above method is characterized in that the first specific time comprises a positive-integer-th frame.

In one embodiment, the above method is characterized in that the first specific time comprises a positive-integer-th superframe.

In one embodiment, the above method is characterized in that the first specific time comprises a positive-integer-th slot.

In one embodiment, the above method is characterized in that the first specific time comprises a positive-integer-th OFDM symbol.

In one embodiment, the above method is characterized in that the first specific time comprises a time for receiving the first signaling plus an RTT.

In one embodiment, the above method is characterized in that the first specific time comprises a time for receiving the first signal plus an RTT.

In one embodiment, the above method is characterized in that the first specific time comprises a time for transmitting the first signaling plus an RTT.

In one embodiment, the above method is characterized in that the first specific time comprises a time for transmitting the first signal plus an RTT.

In one embodiment, the above method is characterized in that the first specific time comprises a time value measured by second.

In one embodiment, the above method is characterized in that the first specific time comprises a time value measured by ms.

In one embodiment, the above method is characterized in that the first specific time comprises a time value measured by minute.

In one embodiment, the above method is characterized in that the first specific time comprises a time value measured by hour.

In one embodiment, the above method is characterized in that the first specific time is related to a DRX.

In one embodiment, the above method is characterized in that the first specific time comprises a start time of a next P1-th DRX period, P1 being a positive integer.

In one embodiment, the above method is characterized in that the first specific time is related to a system message modification period.

In one embodiment, the above method is characterized in that the first specific time comprises a start time of a next P2-th system message modification period, P2 being a positive integer.

In one embodiment, the above method is characterized in that the first specific time is related to a paging period.

In one embodiment, the above method is characterized in that the first specific time comprises a start time of a next P3-th paging period, P3 being a positive integer.

In one embodiment, the above method is characterized in that the first time window and the second time window are for the first data radio bearer group.

In one embodiment, the above method is characterized in that the first time window and the second time window are for data on the first data radio bearer group.

In one embodiment, the above method is characterized in that the first time window and the second time window correspond to an identifier of the first data radio bearer group.

In one embodiment, the above method is characterized in that when the first data bearer group is released, the first time window and the second time window are also released.

In one embodiment, the above method is advantageous in that the system considers time characteristics of user traffic when performing session management, resource scheduling and access control, which can increase flexibility of the system as well as helps reduce power consumption and improve resource utilization.

Specifically, according to one aspect of the present disclosure, the first time window and the second time window are both associated with a PDU session.

In one embodiment, the above method is characterized in that the a PDU session comprises a PDU session.

Specifically, according to one aspect of the present disclosure, the first node automatically enters into a state other than a PDU session active state after the first end time and the second end time.

In one embodiment, the above method is characterized in that the PDU session active state comprises a PDU session active state.

In one embodiment, the above method is characterized in that a state other than the PDU session active state comprises a PDU session inactive pending state.

In one embodiment, the above method is characterized in that a state other than the PDU session active state comprises a PDU session inactive state.

In one embodiment, the above method is characterized in that a PDU Session Establishment Request message is used for indicating the second time window.

In one embodiment, the above method is characterized in that a PDU Session Establishment Accept message is used for indicating the first time window.

In one embodiment, the above method is characterized in that Access and Mobility Management Function (AMF) indicates the first time window to a serving cell of the first node.

Specifically, according to one aspect of the present disclosure, the first receiver receives a second signaling;
the second signaling is used for indicating processing required by the first node after the first end time and the second end time.

In one embodiment, the above method is characterized in that the required processing comprises:
In one embodiment, the first node enters into an RRC idle state after the first end time and the second end time;
In one embodiment, the first node enters into an RRC inactive state after the first end time and the second end time;
In one embodiment, the first node enters into a PDU session inactive pending state after the first end time and the second end time;
In one embodiment, the first node enters into a PDU session inactive state after the first end time and the second end time;
In one embodiment, the first node is after the first end time and the second end time and considers that radio resources of the first node are released;
In one embodiment, the first node will not report measurement result after the first end time and the second end time as well as before next access to system;
In one embodiment, the first node will not monitor a PDCCH channel after the first end time and the second end time as well as before next access to system;
In one embodiment, the first node will not receive a paging message after the first end time and the second end time as well as before next access to system;
In one embodiment, the first node will not update a system message after the first end time and the second end time as well as before next access to system;
In one embodiment, the first node will not perform Tracking Area Update after the first end time and the second end time as well as before next access to system;
In one embodiment, the first node will not perform Registering Area Update after the first end time and the second end time as well as before next access to system;
In one embodiment, the first node turns off power after the first end time and the second end time;
In one embodiment, the first node performs power saving processing after the first end time and the second end time;
In one embodiment, the first node performs RRC state switching after the first end time and the second end time;
In one embodiment, the first node hibernates after the first end time and the second end time;
In one embodiment, the first node will not initiate a scheduling request after the first end time and the second end time as well as before next access to system;
In one embodiment, the first node considers that its context is deleted after the first end time and the second end time;
In one embodiment, the first node considers that a session is over after the first end time and the second end time;
In one embodiment, the first node considers that a PDU session is over after the first end time and the second end time.

Specifically, according to one aspect of the present disclosure, the first node automatically enters into a state other than a radio-resource control connected state after the first end time and the second end time.

In one embodiment, the above method is characterized in that a state other than a radio-resource control connected state comprises an RRC idle state.

In one embodiment, the above method is characterized in that a state other than a radio-resource control connected state comprises an RRC inactive state.

In one embodiment, the first node triggers the required processing related to the first end time and the second end time through a timer.

In one embodiment, the first node triggers a scheduling request related to the first time window and the second time window through a timer.

Specifically, according to one aspect of the present disclosure, resources employed by the first node are released by a serving cell of the first node after the first end time and the second end time.

In one embodiment, the above method is characterized in that the resources employed by the first node comprise a Cell-Radio Network Temporary Identifier (C-RNTI).

In one embodiment, the above method is characterized in that the resources employed by the first node comprise time-frequency resources.

In one embodiment, the above method is characterized in that the resources employed by the first node comprise antenna-port resources.

In one embodiment, the above method is characterized in that the resources employed by the first node comprise Channel State Information-Reference Signal (CSI-RS) resources.

In one embodiment, the above method is characterized in that the resources employed by the first node comprise PUCCH resources.

In one embodiment, the above method is characterized in that the resources employed by the first node comprise a reserved preamble.

In one embodiment, the above method is characterized in that the resources employed by the first node comprise reserved air-interface resources.

In one embodiment, the above method is characterized in that the resources employed by the first node comprise reserved transmission network resources.

In one embodiment, the above method is characterized in that the resources employed by the first node comprise reserved core network resources.

Specifically, according to one aspect of the present disclosure, the first signal is used for random access, the first signal comprises second information, and the second information is used for indicating a cause of the random access, the second information being related to the second time window.

In one embodiment, the above method is characterized in that the first signal comprises a Preamble.

In one embodiment, the above method is characterized in that the first signal comprises a msgA.

In one embodiment, the above method is characterized in that the first signal comprises a msg3.

In one embodiment, the above method is characterized in that the first signal comprises an RRCSetupRequest message.

In one embodiment, the above method is characterized in that the cause of the random access comprises a EstablishmentCause.

In one embodiment, the above method is characterized in that the cause of the random access comprises DelayedData.

In one embodiment, the above method is characterized in that the cause of the random access comprises a DelayedSignaling.

In one embodiment, the above method is characterized in that the cause of the random access comprises a WindowedSignaling.

In one embodiment, the above method is characterized in that the cause of the random access comprises WindowedData.

In one embodiment, the above method is characterized in that the cause of the random access is used for indicating that a data scheduling request will occur in a window.

In one embodiment, the above method is characterized in that the cause of the random access is used for indicating that traffic data will arrive in a window.

In one embodiment, the above method is characterized in that the cause of the random access is used for indicating that a resource requirement is only triggered in a window.

In one embodiment, the above method is characterized in that the cause of the random access is used for indicating that a session only occurs in a window.

In one embodiment, the above method is characterized in that the cause of the random access is used for indicating that a data scheduling request will occur outside a window.

In one embodiment, the above method is characterized in that the cause of the random access is used for indicating that traffic data will arrive outside a window.

In one embodiment, the above method is characterized in that the cause of the random access is used for indicating that a resource requirement is only triggered outside a window.

In one embodiment, the above method is characterized in that the cause of the random access is used for indicating that a session only occurs outside a window.

In one embodiment, the above method is characterized in that the second information is used for indicating whether the first signal is used for determining the second time window.

In one embodiment, the above method is characterized in that the second information indicates a length of the second time window.

In one embodiment, the above method is characterized in that the second information indicates characteristics of the second time window, and the characteristics comprise whether the first start time is a current time or a certain time after the current time.

In one embodiment, the above method is characterized in that the second information indicates a radio bearer associated with the second time window.

In one embodiment, the above method is characterized in that the second information indicates a level of a duration of the second time window.

In one embodiment, the above method is characterized in that the second information indicates the first time length.

Specifically, according to one aspect of the present disclosure, the second time window is related to a geographic position of the first node.

In one embodiment, when the first node is located at the edge of a cell, the second time window is longer than when it is located in the center of the cell.

In one embodiment, when a Timing Advance (TA) of the first node increases, a length of the second time window also increases.

In one embodiment, a length of the second time window is longer than or equal to a length of TA.

Specifically, according to one aspect of the present disclosure, the first node is prohibited to transmit scheduling request information in the first time window, and a Scheduling Request count of the first node is not increased in the first time window.

In one embodiment, the above method is characterized in that the Scheduling Request count comprises an SR-Count.

In one embodiment, the above method is characterized in that a Scheduling Request count of the first node remains unchanged in the first time window.

In one embodiment, the above method is characterized in that a Scheduling Request count of the first node decreases in the first time window.

In one embodiment, the above method is characterized in that a Scheduling Request count of the first node is reset in the first time window.

Specifically, according to one aspect of the present disclosure, the first receiver receives a third signaling; and the first transmitter transmits a third signal;

the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency-resource set(s), K1 being a positive integer.

In one embodiment, the above method is characterized in that the third signaling comprises DCI.

In one embodiment, the above method is characterized in that the third signaling comprises a MAC CE.

In one embodiment, the above method is characterized in that the third signaling comprises an RRC signaling.

In one embodiment, the above method is characterized in that the third signaling is transmitted on a PDCCH.

In one embodiment, the above method is characterized in that the third signaling is transmitted on a PDSCH.

In one embodiment, the above method is characterized in that the K1 is a positive integer greater than 1.

In one embodiment, the above method is characterized in that the third signaling comprises an SIB.

In one embodiment, the above method is characterized in that the third signal comprises an RRC signaling.

In one embodiment, the above method is characterized in that the third signal comprises an NAS signaling.

In one embodiment, the above method is characterized in that the third signal is transmitted on a PUCCH.

In one embodiment, the above method is characterized in that the K1 time window(s) corresponds (respectively correspond) to the K1 cell(s).

In one embodiment, the above method is characterized in that the K1 time window(s) corresponds (respectively correspond) to the K1 beam(s).

In one embodiment, the above method is characterized in that the K1 time window(s) corresponds (respectively correspond) to the K1 reference signal(s).

In one embodiment, the above method is characterized in that the K1 time window(s) corresponds (respectively correspond) to the K1 antenna port(s).

In one embodiment, the above method is characterized in that the K1 time window(s) corresponds (respectively correspond) to the K1 carrier(s).

In one embodiment, the above method is characterized in that the K1 time window(s) corresponds (respectively correspond) to the K1 Synchronization Signal Block(s).

Specifically, according to one aspect of the present disclosure, the first node is a UE.

Specifically, according to one aspect of the present disclosure, the first node is an IoT terminal.

Specifically, according to one aspect of the present disclosure, the first node is a relay.

Specifically, according to one aspect of the present disclosure, the first node is a vehicle terminal.

Specifically, according to one aspect of the present disclosure, the first node is an aircraft.

The present disclosure provides a method in a second node for wireless communications, comprising:
transmitting a first signaling; and
receiving a first signal;
herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

Specifically, according to one aspect of the present disclosure, the first time window and the second time window are associated with a PDU session.

Specifically, according to one aspect of the present disclosure, the transmitter of the first signal automatically enters into a state other than a PDU session active state after the first end time and the second end time.

Specifically, according to one aspect of the present disclosure, the second transmitter transmits a second signaling; the second signaling is used for indicating processing required by the transmitter of the first signal after the first end time and the second end time.

Specifically, according to one aspect of the present disclosure, the transmitter of the first signal automatically enters into a state other than a radio-resource control connected state after the first end time and the second end time.

Specifically, according to one aspect of the present disclosure, resources employed by the transmitter of the first signal are released by a serving cell of the transmitter of the first signal after the first end time and the second end time.

specifically, according to one aspect of the present disclosure, the first signal is used for random access, the first signal comprises second information, and the second information is used for indicating a cause of the random access, the second information being related to the second time window.

Specifically, according to one aspect of the present disclosure, the second time window is related to a geographic position of the transmitter of the first signal.

Specifically, according to one aspect of the present disclosure, the transmitter of the first signal is prohibited to transmit scheduling request information in the first time window, and a Scheduling Request count of the transmitter of the first signal is not increased in the first time window.

Specifically, according to one aspect of the present disclosure, the second transmitter transmits a third signaling; and the second receiver receives a third signal;
the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

Specifically, according to one aspect of the present disclosure, the second node is a base station.

Specifically, according to one aspect of the present disclosure, the second node is a relay.

Specifically, according to one aspect of the present disclosure, the second node is a vehicle terminal.

Specifically, according to one aspect of the present disclosure, the second node is an aircraft.

Specifically, according to one aspect of the present disclosure, the second node is a group header.

Specifically, according to one aspect of the present disclosure, the second node is a satellite.

The present disclosure provides a first node for wireless communications, comprising:

a first receiver, receiving a first signaling; and a first transmitter, transmitting a first signal;

herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

The present disclosure provides a second node for wireless communications, comprising:

a second transmitter, transmitting a first signaling; and a second receiver, receiving a first signal;

herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

In one embodiment, the present disclosure has the following advantages over conventional schemes:

when the UE only needs to transmit less data that can be limited in time domain or traffic only occurs in a specific time, and if the network is able to know this kind of information, it is very beneficial for the network to flexibly perform resource allocation, access control and session management. Meanwhile, a set of effective signaling processing process can also be established for simplifying the design and reducing signaling overhead. On the other hand, when network is congested, reasonable resource scheduling can be performed according to these pieces of information, which helps accurately grasp the situation and will not cause network congestion and traffic quality decline; for users, it can speed up access and reduce communication delay. The present disclosure configures a first time window and a second time window, associates them with corresponding traffic bearers, and modulates corresponding methods and schemes, which enables the network with more intelligence, more effective scheduling, less power consumption and more flexible session management, and to a certain extent, the delay can also be effectively reduced. These are not available to conventional schemes.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of K1 time-frequency resource set(s) according to one embodiment of the present disclosure.

FIG. 9 illustrates a schematic diagram of a first node and a second node according to one embodiment of the present disclosure.

FIG. 10 illustrates a schematic diagram of a first node, a second node and a third node according to one embodiment of the present disclosure.

FIG. 11 illustrates a schematic diagram of whether a first signaling is used for determining a first time window being used for determining whether a first signal is used for determining a second time window according to one embodiment of the present disclosure.

FIG. 12 illustrates a schematic diagram of whether a third signaling is used for determining a first time window set being used for determining whether a third signal is used for determining a second time window set according to one embodiment of the present disclosure.

FIG. 13 illustrates a structure block diagram of a processing device in a first node according to one embodiment of the present disclosure.

FIG. 14 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
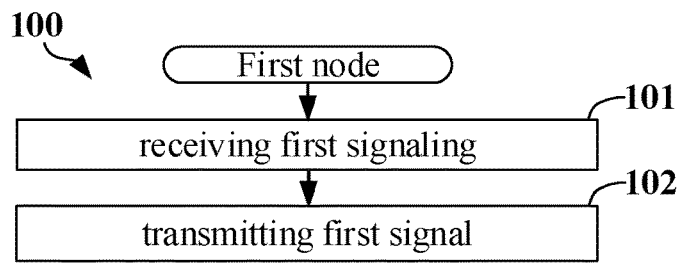
FIG. 1 illustrates a flowchart of receiving a first signaling and transmitting a first signal according to one embodiment of the present disclosure.

Embodiment 1 illustrates a flowchart of receiving a first signaling and transmitting a first signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, the first node in the present disclosure receives a first signaling in step 101; transmits a first signal in step 102; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

In one embodiment, the first node is a UE.

In one embodiment, the first time length is configured by a serving cell of the first node via a system message.

In one embodiment, the first time length is configured by a serving cell of the first node via an RRC signaling.

In one embodiment, the first specific time is configured by a serving cell of the first node via a system message.

In one embodiment, the first specific time is configured by a serving cell of the first node via an RRC signaling.

In one embodiment, the first signaling explicitly indicates the first time window.

In one embodiment, the first signaling indicates the first start time and the first end time.

In one embodiment, the first signaling indicates the first start time and a duration of the first time window.

In one embodiment, the first signaling comprises information of a data radio bearer associated with the first time window.

In one embodiment, the first signaling comprises information of a radio bearer associated with the first time window.

In one embodiment, the first signaling comprises information of a first data radio bearer group associated with the first time window.

In one embodiment, the first signaling indicates a time unit for measurement of the first time window.

In one embodiment, the first signaling carries configuration information of the first time window.

In one embodiment, the first signaling indicates application range of the first time window.

In one embodiment, the first signal explicitly indicates the second signal.

In one embodiment, the first signal indicates the second start time and the second end time.

In one embodiment, the first signal indicates the second start time and a duration of the second time window.

In one embodiment, the first signal comprises information of a data radio bearer associated with the second time window.

In one embodiment, the first signal comprises information of a radio bearer associated with the second time window.

In one embodiment, the first signal comprises information of a first data radio bearer group associated with the second time window.

In one embodiment, the first signal comprises a UEAssistanceInformation message.

In one embodiment, the first signal is used for indicating residual power status.

In one embodiment, the first signal is used for indicating that residual power of the first node can only support up to the second end time.

In one embodiment, the first signal is used for indicating a time limit of a current session of the first node.

In one embodiment, the first signal indicates a time unit for measurement of the second time window.

In one embodiment, the first signal carries configuration information of the second time window.

In one embodiment, the first signal indicates application range of the second time window.

In one embodiment, time-frequency resources occupied by the first signal are used for implicitly determining the second time window.

In one embodiment, a start time of the first time window is a time when the first signaling is received.

In one embodiment, a start time of the first time window is a time after the first signaling is received.

In one embodiment, a start time of the second time window is a time when the first signaling is transmitted.

In one embodiment, a start time of the second time window is a time after the first signaling is transmitted.

In one embodiment, the first signaling indicates effective times of the first time window and the second time window.

In one embodiment, the first end time and the second end time are both less than an infinity.

In one embodiment, the first signaling is used for indicating that the first node is allowed to request scheduling within or outside a first time window.

In one embodiment, the first signaling is used for indicating that the first node is allowed to request scheduling within a second time window or outside the first time window.

In one embodiment, the first signal is used for indicating that the first node requests scheduling within a second time window or outside the first time window.

In one embodiment, the first signaling is used for indicating that the first node is scheduled within or outside a first time window.

In one embodiment, the first signaling is used for indicating that the first node needs to be scheduled within a second time window or outside the first time window.

In one embodiment, the first signal is used for indicating that the first node needs to be scheduled within a second time window or outside the first time window.

In one embodiment, the first node requests scheduling in RRC connected state within the first time window.

In one embodiment, the first node requests scheduling in RRC connected state within the second time window.

In one embodiment, the first node requests scheduling in RRC connected state outside the first time window.

In one embodiment, the first node requests scheduling in RRC connected state outside the second time window.

In one embodiment, the first node requests scheduling in RRC inactive state within the first time window.

In one embodiment, the first node requests scheduling in RRC inactive state within the second time window.

In one embodiment, the first node requests scheduling in RRC idle state within the first time window.

In one embodiment, the first node is scheduled in an RRC connected state within the first time window.

In one embodiment, the first node is scheduled in an RRC connected state within the second time window.

In one embodiment, the first node is scheduled in an RRC connected state outside the first time window.

In one embodiment, the first node is scheduled in an RRC connected state outside the second time window.

In one embodiment, the first node is scheduled in an RRC inactive state within the first time window.

In one embodiment, the first node is scheduled in an RRC inactive state within the second time window.

In one embodiment, the first node is allocated resources in an RRC idle state within the first time window.

In one embodiment, the being scheduled comprises the resource allocation.

In one embodiment, in a communication process, when the first node requests scheduling for the first data radio bearer group in the first time window, and the first node does not request scheduling for the first data radio bearer group outside the first time window.

In one embodiment, in a communication process, when the first node requests scheduling for the first data radio bearer group outside the first time window, the first node does not request scheduling for the first data radio bearer group within the first time window.

In one embodiment, in a communication process, when the first node is scheduled for the first data radio bearer group in the first time window, the first node is not scheduled for the first data radio bearer group outside the first time window.

In one embodiment, in a communication process, when the first node is scheduled for the first data radio bearer group outside the first time window, the first node is not scheduled for the first data radio bearer group within the first time window.

In one embodiment, in a communication process, the first node requests scheduling for the first data radio bearer group only within the first time window or outside the first time window.

In one embodiment, in a communication process, the first node is scheduled for the first data radio bearer group only within the first time window or outside the first time window.

In one embodiment, in a communication process, when the first node requests scheduling for the first data radio bearer group in the second time window, the first node does not request scheduling for the first data radio bearer group outside the second time window.

In one embodiment, in a communication process, when the first node requests scheduling for the first data radio bearer group outside the second time window, the first node does not request scheduling for the first data radio bearer group within the second time window.

In one embodiment, in a communication process, when the first node is scheduled for the first data radio bearer group within the second time window, the first node is not scheduled for the first data radio bearer group outside the second time window.

In one embodiment, in a communication process, when the first node is scheduled for the first data radio bearer group outside the second time window, the first node is not scheduled for the first data radio bearer group within the second time window.

In one embodiment, in a communication process, the first node requests scheduling for the first data radio bearer group only within the second time window or outside the second time window.

In one embodiment, in a communication process, the first node is scheduled for the first data radio bearer group only within the second time window or outside the second time window.

In one embodiment, the first data radio bearer group comprises data radio bearers in a Master Cell Group and a Secondary Cell Group.

Embodiment 2

Figure 2:
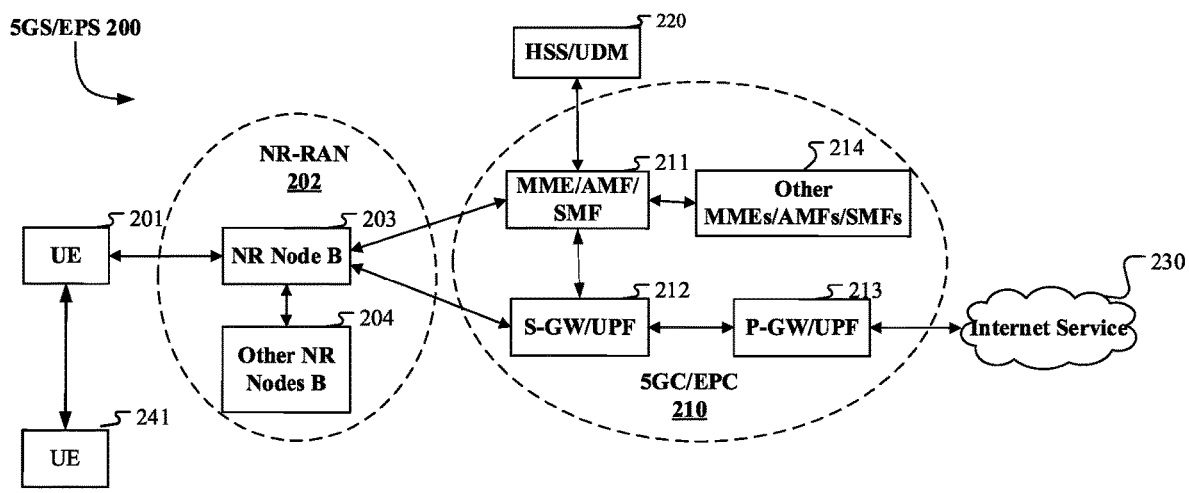
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB)

203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN communications.

In one embodiment, the UE 201 supports communications within Large-Delay-Inequality networks.

In one embodiment, the UE 201 supports V2X transmission.

In one embodiment, the gNB 203 corresponds to the second node in the present disclosure.

In one embodiment, the gNB 203 supports NTN communications.

In one embodiment, the gNB 203 supports communications within Large-Delay-Inequality networks.

In one embodiment, the gNB 203 supports V2X transmission.

Embodiment 3

Figure 3:
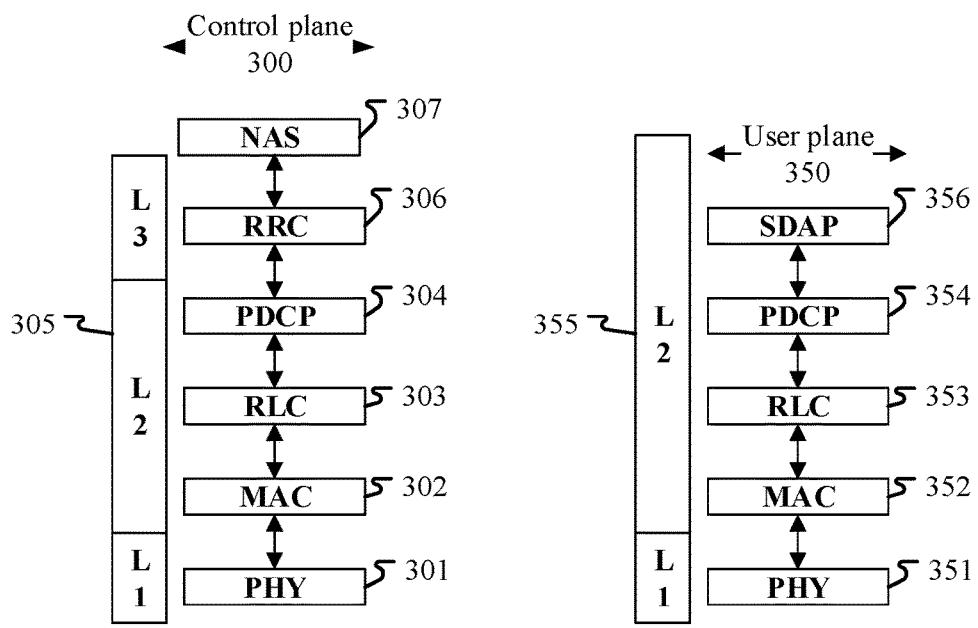
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or vehicle-mounted communication equipment) and a second node (gNB, UE or RSU in V2X, vehicle equipment or vehicle-mounted communication equipment), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a data packet, retransmission of a lost data packet via ARQ, and also provides repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also in charge of HARQ operation. In the control plane 300, the RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.). The NAS sublayer 307 is responsible for processing of signalings in non-access layers.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY 301, MAC 302, RRC 306 or NAS 307.

In one embodiment, the first signal in the present disclosure is generated by the PHY 301, MAC 302, RRC 306 or NAS 307.

In one embodiment, the second signaling in the present disclosure is generated by the PHY 301, MAC 302, RRC 306 or NAS 307.

In one embodiment, the third signaling in the present disclosure is generated by the PHY 301, MAC 302, RRC 306 or NAS 307.

In one embodiment, the third signal in the present disclosure is generated by the PHY 301, MAC 302, RRC 306 or NAS 307.

Embodiment 4

Figure 4:
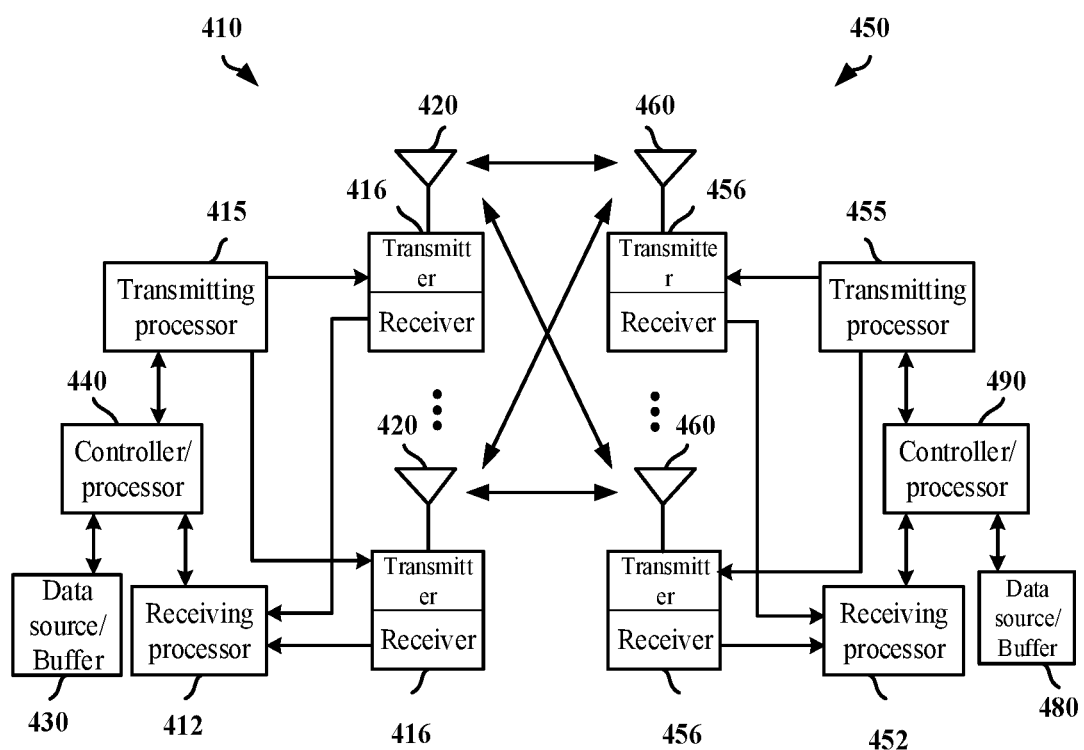
FIG. 4 illustrates a schematic diagram of a first node and a second node according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher-layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least receives a first signaling; and transmits a first signal; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

In one embodiment, the first communication device 450 comprises a memory that stores a computer readable instruction program. The computer readable instruction program generates an action when executed by at least one processor. The action includes: receiving a first signaling; and transmitting a first signal; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

In one embodiment, the second communication device 410 comprises at least one processor and at least one memory. The at least one memory comprises computer program codes; the at least one memory and the computer program codes are configured to be used in collaboration with the at least one processor. The second communication device 410 at least transmits a first signaling; and receives a first signal; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

In one embodiment, the second communication device 410 comprises a memory that stores a computer readable instruction program. The computer readable instruction program generates an action when executed by at least one processor. The action includes: transmitting a first signaling; and receiving a first signal; herein, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a vehicle terminal.

In one embodiment, the second communication device 450 is a base station.

In one embodiment, the second communication device 410 is a UE.

In one embodiment, the second communication device 410 is a satellite.

In one embodiment, the receiver 456 (including the antenna 460), the receiving processor 452 and the controller/processor 490 are used to receive the first signaling in the present disclosure.

In one embodiment, the receiver 456 (including the antenna 460), the receiving processor 452 and the controller/processor 490 are used to receive the second signaling in the present disclosure.

In one embodiment, the receiver 456 (including the antenna 460), the receiving processor 452 and the controller/processor 490 are used to receive the third signaling in the present disclosure.

In one embodiment, the transmitter 456 (including the antenna 460), the transmitting processor 455 and the controller/processor 490 are used to transmit the first signal in the present disclosure.

In one embodiment, the transmitter 456 (including the antenna 460), the transmitting processor 455 and the controller/processor 490 are used to transmit the third signal in the present disclosure.

In one embodiment, the transmitter 416 (including the antenna 420), the transmitting processor 412 and the controller/processor 440 are used to transmit the first signaling in the present disclosure.

In one embodiment, the transmitter 416 (including the antenna 420), the transmitting processor 412 and the controller/processor 440 are used to transmit the second signaling in the present disclosure.

In one embodiment, the receiver 416 (including the antenna 420), the receiving processor 412 and the controller/processor 440 are used to receive the first signal in the present disclosure.

In one embodiment, the receiver 416 (including the antenna 420), the receiving processor 412 and the controller/processor 440 are used to receive the third signal in the present disclosure.

Embodiment 5

Figure 5:
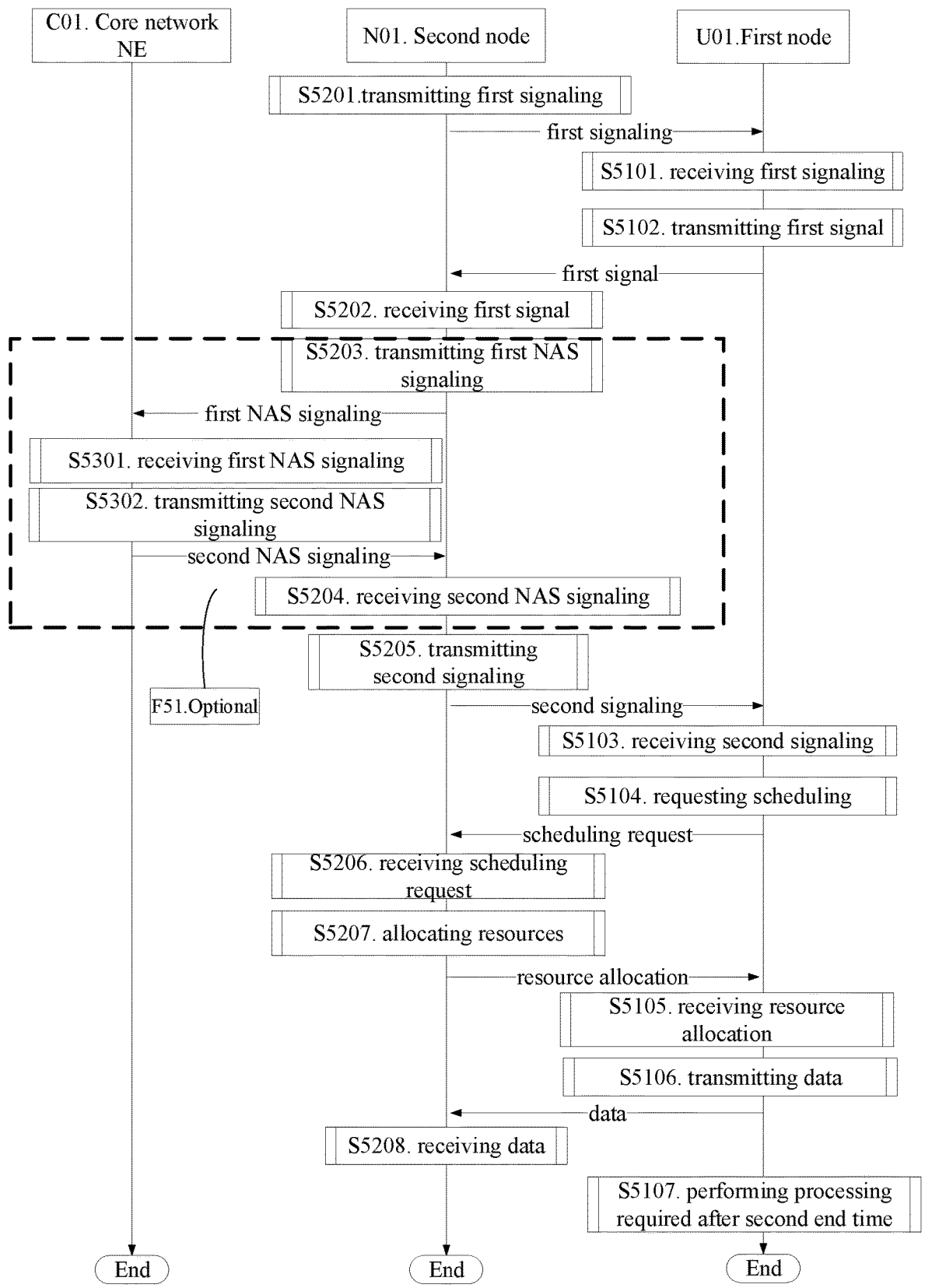
FIG. 5 illustrates a flowchart of wireless communications according to one embodiment of the present disclosure.

Embodiment 5 illustrates a flowchart of radio signal transmission according to one embodiment in the present disclosure, as shown in FIG. 5. In FIG. 5, a second node N01 is a serving cell base station of a first node U01, C01 is a Network Element (NE) of a core network, particularly, the order of steps in these boxes in the embodiment does not limit the order of signal transmission and implementation in the present disclosure.

The second node N01 transmits a first signaling in step S5201.

The first node U01 receives a first signaling in step S5101, and transmits a first signal in step S5102.

In Embodiment 5, whether the first signaling in the present disclosure is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node U01 requests scheduling for the first data radio bearer group is related to an RRC state of the first node U01, the first time window and the second time window; whether a serving cell N01 of the first node U01 allocates resources for the first data radio bearer group is related to an RRC state of the first node U01, the first time window and the second time window; in a communication process, the first node U01 requests scheduling for the first data radio bearer group only within or outside the first time window and the second time window; a serving cell N01 of the first node U01 allocates resources for the first data radio bearer group only within or outside the first time window and the second time window; lengths of the first time window and the second time window are greater than a first time length, and the first start time and the second start time are equal to a first specific time.

In one embodiment, the first signaling comprises a paging message.

In one embodiment, the first signaling comprises a paging message from the core network NE C01.

In one embodiment, the first signaling comprises an SIB.

In one embodiment, the core network NE C01 is Access and Mobility Management Function (AMF).

In one embodiment, the core network NE C01 is Session Management Function (SMF).

In one embodiment, the core network NE C01 is User Plane Function (UPF).

In one embodiment, the core network NE C01 is a core network of 5G system.

In one embodiment, the core network NE C01 is a core network of Evolved Packet Core (EPS).

In one embodiment, the first signaling is not used for determining the first time window.

In one embodiment, the first signaling does not comprise configuration information of the first time window.

In one embodiment, information of the first time window is not comprised in the first signaling.

In one embodiment, the first signal is used for indicating the second time window.

In one embodiment, the first signal is used for indicating the second start time and the second end time.

In one embodiment, the first signal is used for indicating a duration of the second time window.

In one embodiment, the first signal is used for indicating configuration information of the second time window.

In one embodiment, the first signal is used for indicating that the second time widow is associated with data traffic that triggers a second signal.

In one embodiment, the first signal is used for indicating information of the first data radio bearer group associated with a second time window.

In one embodiment, the first data radio bearer group comprises all data radio bearers of the first node U01.

In one embodiment, the first radio bearer comprises all data radio bearers generated in a session initiated by the first node U01.

In one embodiment, the first signal is used for indicating that the first node U01 only transmits scheduling request information in a second time window.

In one embodiment, the first signal is used for indicating that traffic data of the first node U01 is only generated in a second time window.

In one embodiment, the first signal is used for indicating that traffic data of the first node U01 is only generated outside a second time window.

In one embodiment, the first signal comprises a paging response message.

In one embodiment, the first signal comprises a random access message.

In one embodiment, the first signal comprises a msgA.

In one embodiment, the first signal comprises a PDU Session Establishment Request message.

In one embodiment, the first signal comprises an RRC-SetupRequest message.

In one embodiment, the second node N01 transmits a first NAS signaling to the core network NE C01 in step S5203, and the first signal is used for generating the first NAS signaling.

In one embodiment, the first signal is used for triggering the first NAS signaling.

In one embodiment, the first signal is an RRC signaling, and the first NAS signaling is generated according to an NAS signaling comprised in the first signal.

In one embodiment, the first signal is an NAS signaling, and the first NAS signaling is a copy of the first signal.

In one embodiment, the core network NE C01 receives the first NAS signaling in step S5301.

In one embodiment, the core network NE C01 accepts a PDU Session Establishment Request.

In one embodiment, the core network NE C01 transmits a second NAS signaling in step S5302, and the second NAS signaling is used for generating the second signaling.

In one embodiment, the second NAS signaling is used for feeding back the first NAS signaling.

In one embodiment, the second NAS signaling is used for triggering the second signaling.

In one embodiment, the second signaling is an RRC signaling, and the second NAS signaling is comprised in the second signaling.

In one embodiment, the second signaling is a copy of the second NAS signaling.

In one embodiment, the second signaling comprises a PDU Session Establishment Accept message.

In one embodiment, the second signaling comprises an RRCSetup message.

In one embodiment, the second signaling comprises a DCI signaling.

In one embodiment, the second signaling comprises a MAC CE signaling.

In one embodiment, the second signaling comprises an RRC message.

In one embodiment, the second signaling comprises an RRC signaling, and the RRC signaling comprises a signaling from an NAS.

In one embodiment, the second signaling comprises an RRCReconfiguration message.

In one embodiment, the second node N01 receives the second NAS signaling in step S5204.

In one embodiment, the second node N01 transmits the second signaling in step S5205.

In one embodiment, the first node U01 receives the second signaling in step S5103, the second signaling is used for indicating processing required by the first node U01 after the second end time.

In one embodiment, the first node U01 is located within the second time window and transmits a scheduling request signaling in step S5104.

In one embodiment, the second node N01 receives a scheduling request signaling in step S5206.

In one embodiment, the second node N01 transmits a resource allocation signaling in step S5207.

In one embodiment, the first node U01 receives a resource allocation signaling in step S5105.

In one embodiment, the first node U01 transmits data according to the received resource allocation signaling in step S5106.

In one embodiment, the second node N01 receives the data in step S5208.

In one embodiment, the first node U01, after the second time window ends, performs processing required after the second end time.

In one embodiment, the phrase the performing the processing required after the second end time, comprising:
  In one embodiment, the first node U01 automatically enters into an RRC idle state after a second end time;
  In one embodiment, the first node U01 automatically enters into an RRC inactive state after a second end time;
  In one embodiment, the first node U01 automatically releases an RRC link after a second end time;
  In one embodiment, the first node U01 is not allowed to transmit a scheduling request signaling after a second end time and before next random access;

In one embodiment, the first node U01 does not need to monitor a PDCCH channel after a second end time and before next random access;

In one embodiment, the first node U01 does not need to receive a paging message after a second end time;

In one embodiment, the first node U01 automatically enters into a PDU session inactive state after a second end time;

In one embodiment, resources occupied by the first node U01 for transmitting a PDCCH channel after a second end time are not available.

In one embodiment, a Preamble occupied by the first node U01 for a Contention Free Random Access (CFRA) after a second end time is not available.

In one embodiment, the second node N01 immediately releases all resources occupied by the first node at the second end time.

In one embodiment, the second node N01 immediately releases all resources occupied by the first node one time offset after the second end time.

In one embodiment, C-RNTI occupied by the first node U01 after a second end time is not available.

In one embodiment, the second node N01 retains context of the first node U01 after the second end time.

In one embodiment, the second node N01 releases an RRC link of the first node U01 after the second end time.

In one embodiment, the second node N01 releases the first data radio bearer group associated with the second time window after the second end time.

In one embodiment, the first node N01 releases the first data radio bearer group associated with the second time window after the second end time.

In one embodiment, the second node N01 no longer schedules the first data radio bearer group associated with the second time window after the second end time.

Embodiment 6

Figure 6:
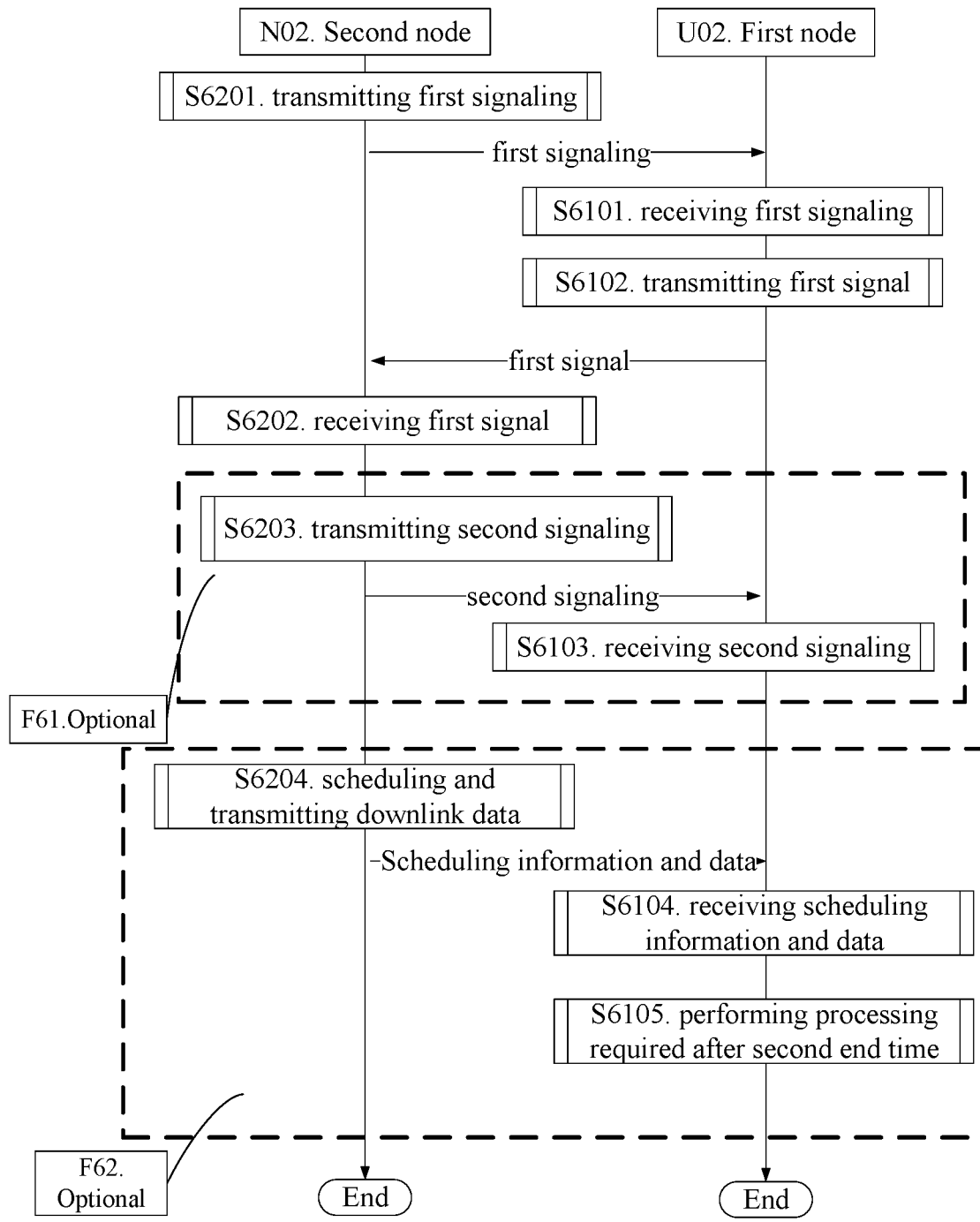
FIG. 6 illustrates a flowchart of wireless communications according to one embodiment of the present disclosure.

Embodiment 6 illustrates a flowchart of radio signal transmission according to one embodiment of the present disclosure, as shown in FIG. 6. In FIG. 6, a second node N02 is a serving cell base station of a first node U02, particularly, the order of steps in these boxes in the embodiment does not limit the order of signal transmission and implementation in the present disclosure.

The second node N02 transmits a first signaling in step S6201.

The first node U02 receives a first signaling in step S6101, and transmits a first signal in step S6102.

In Embodiment 6, whether the first signaling in the present disclosure is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node U01 requests scheduling for the first data radio bearer group is related to an RRC state of the first node U01, the first time window and the second time window; whether a serving cell N01 of the first node U01 allocates resources for the first data radio bearer group is related to an RRC state of the first node U01, the first time window and the second time window; in a communication process, the first node U01 requests scheduling for the first data radio bearer group only within or outside the first time window and the second time window; a serving cell N01 of the first node U01 allocates resources for the first data radio bearer group only within or outside the first time window and the second time window; lengths of the first time window and the second time window are greater than a first time length, and the first start time and the second start time are equal to a first specific time.

In one embodiment, an interface that the first node U02 in communication with the first cell N02 is a Uu interface.

In one embodiment, an interface that the first node U02 in communication with the first cell N02 is a PC5 interface.

In one embodiment, the first signaling comprises cell payload information.

In one embodiment, the first signaling comprises cell overload warning information.

In one embodiment, the first signaling comprises cell barring information.

In one embodiment, the first signaling comprises barring information aimed at different traffics.

In one embodiment, the first signaling comprises barring information before a third time.

In one embodiment, the first signal is used for random access.

In one embodiment, the first signal comprises an RRC-SetupRequest message.

In one embodiment, the first signaling is not used for determining the first time window.

In one embodiment, the first signaling does not comprise configuration information of the first time window.

In one embodiment, the first signal is used for determining the second time window.

In one embodiment, the second signal comprises configuration information related to the second time window.

In one embodiment, the second start time of the second time window is after a time for transmitting the first signal.

In one embodiment, the second start time of the second time window is after a time for transmitting the first signal, and the second start time is after the third time.

In one embodiment, the first signal is used for random access, the first signal comprises second information, the second information is used for indicating a cause of the random access, and the second information is related to the second time window.

In one embodiment, the second information is used for indicating that the first signal is used for determining the second time window.

In one embodiment, the second information is used for indicating that access of the first node U02 is not restricted.

In one embodiment, the second information is used for indicating that data traffic of the first node U02 occurs after a certain time.

In one embodiment, the second information is used for indicating that data traffic of the first node U02 is Delay Tolerant.

In one embodiment, the first node U02 only performs a scheduling request for the first data radio bearer group associated with the second time window in the second time window.

In one embodiment, the second node N02 only performs resource allocation for the first data radio bearer group associated with the second time window in the second time window.

In one embodiment, the first data radio bearer group comprises all data radio bearer groups of the first node U02.

In one embodiment, the second node N02 receives the first signal in step S6202.

In one embodiment, the second node N02 transmits the second signaling in step S6203.

In one embodiment, the first node U02 receives the second signaling in step S6103, and the second signaling is used for indicating processing required by the first node U02 after the second end time.

In one embodiment, the second signaling comprises an RRCSetup message.

In one embodiment, the second signaling comprises an RRCReconfiguration message.

In one embodiment, the second node N02 transmits a scheduling signaling and downlink data simultaneously in a second time window in step S6204.

In one embodiment, the first node U02 receives a scheduling signaling and downlink data simultaneously in step S6104.

In one embodiment, the first node U02 performs processing required after the second end time in step S6105.

In one embodiment, the processing required after the second end time comprises automatically entering into an RRC Idle state.

In one embodiment, the processing required after the second end time comprises no longer transmitting a scheduling request message.

In one embodiment, the processing required after the second end time comprises considering a current radio link unavailable.

In one embodiment, the processing required after the second end time comprises releasing an RRC link.

Embodiment 7

Figure 7:
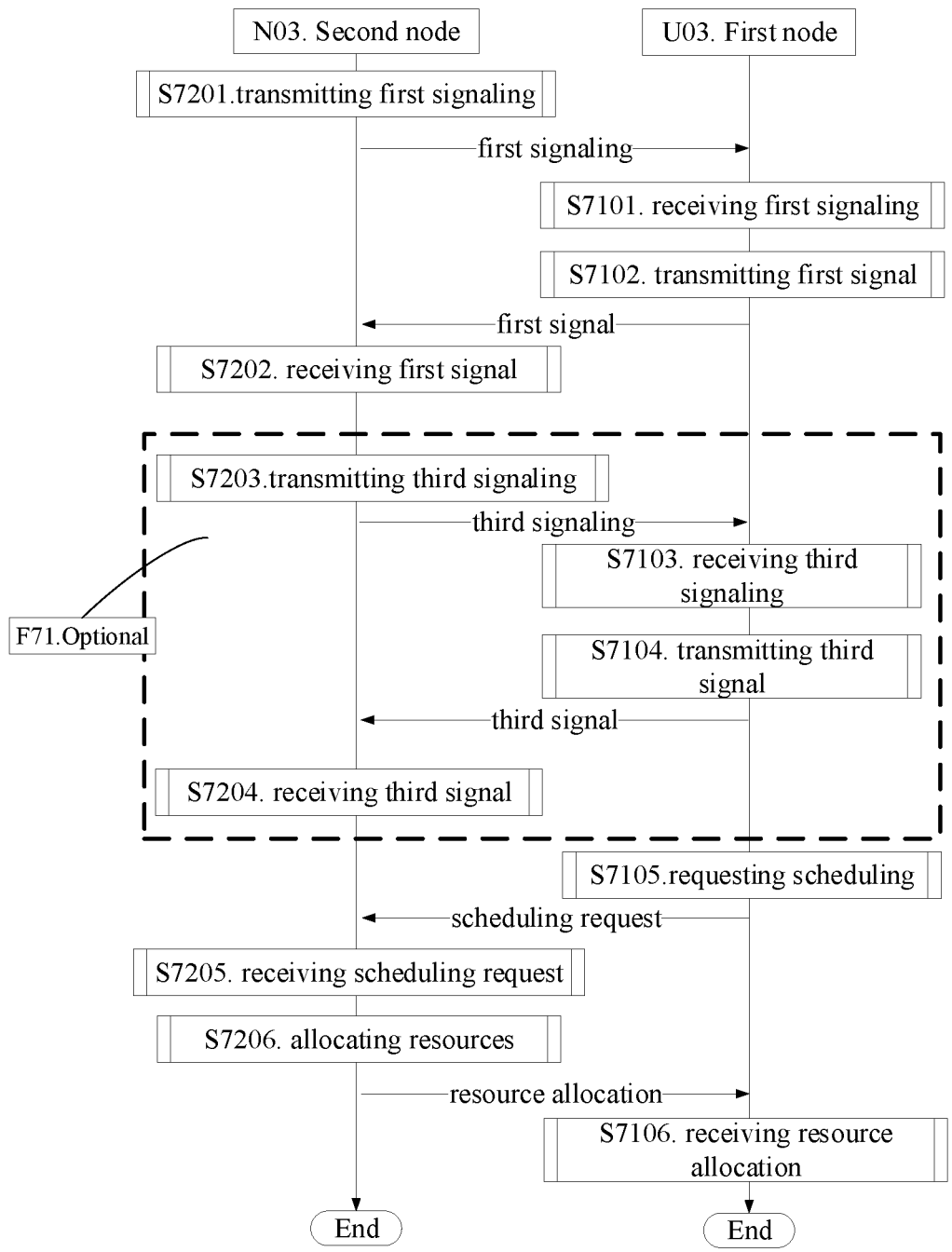
FIG. 7 illustrates a flowchart of wireless communications according to one embodiment of the present disclosure.

Embodiment 7 illustrates a flowchart of radio signal transmission according to one embodiment of the present disclosure, as shown in FIG. 7. In FIG. 7 a second node N03 is a serving cell base station of a first node U03, particularly, the order of steps in these boxes in the embodiment does not limit the order of signal transmission and implementation in the present disclosure.

The second node N03 transmits a first signaling in step S7201.

The first node U03 receives a first signaling in step S7101, and transmits a first signal in step S7102.

In Embodiment 7, whether the first signaling in the present disclosure is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node U01 requests scheduling for the first data radio bearer group is related to an RRC state of the first node U01, the first time window and the second time window; whether a serving cell N01 of the first node U01 allocates resources for the first data radio bearer group is related to an RRC state of the first node U01, the first time window and the second time window; in a communication process, the first node U01 requests scheduling for the first data radio bearer group only within or outside the first time window and the second time window; a serving cell N01 of the first node U01 allocates resources for the first data radio bearer group only within or outside the first time window and the second time window; lengths of the first time window and the second time window are greater than a first time length, and the first start time and the second start time are equal to a first specific time.

In one embodiment, the first signaling is used for indicating information of the first time window.

In one embodiment, the first signaling is used for indicating the first start time and a first end time.

In one embodiment, the first signaling is used for indicating a start time and a duration of the first time window.

In one embodiment, the first signaling is used for indicating the first data radio bearer group that is associated with the first time window.

In one embodiment, the first signaling comprises an SIB.

In one embodiment, the first signaling is used for indicating that a node group served by the second node prohibits transmission of a scheduling request in the first time window, wherein the node group at least comprises a node.

In one embodiment, the first signaling is used for indicating that a node group served by the second node prohibits transmission of a scheduling request aimed at specific traffic in the first time window, wherein the node group at least comprises a node.

In one embodiment, the node group comprises the first node U03.

In one embodiment, the specific traffic comprises traffic with a specific priority.

In one embodiment, the specific traffic comprises traffic with a specific logical channel.

In one embodiment, the specific traffic comprises traffic with specific slicing.

In one embodiment, the specific traffic comprises traffic with specific QoS.

In one embodiment, the traffic with specific QoS comprises traffic with Guaranteed Bit Rate (GBR) less than a certain threshold, such as 100 kbps.

In one embodiment, the traffic with specific QoS comprises traffic with Aggregated Maximum Bit Rate (AMBR) less than a certain threshold, such as 100 kbps.

In one embodiment, the traffic with specific QoS comprises traffic with a specific delay requirement, in one subembodiment, the specific delay requirement comprises a delay less than a certain value, such as 1 ms; or a delay greater than a certain value, such as 2 ms.

In one embodiment, the specific traffic comprises a data radio bearer instead of a signaling radio bearer.

In one embodiment, the first data radio bearer group comprises a first radio bearer, and the first radio bearer is associated with a logical channel In one embodiment, the first signaling is used for indicating that the first node U03 is prohibited to request scheduling for the first radio bearer group in the first time window.

In one embodiment, the first signaling is used for indicating that the first node U03 only allows to request scheduling for the first radio bearer group outside the first time window.

In one embodiment, the first signaling is used for indicating that the second node N03 does not allocate resources for the first radio bearer in the first time window.

In one embodiment, the first signaling is used for indicating that the second node N03 only allocates resources for the first radio bearer outside the first time window.

In one embodiment, the scheduling request comprises transmitting an SR signal.

In one embodiment, the scheduling request comprises transmitting BSR information.

In one embodiment, the scheduling request comprises transmitting an RRC signaling.

In one embodiment, the resource allocation comprises a DCI signaling.

In one embodiment, the resource allocation comprises an RRC signaling.

In one embodiment, the resource allocation comprises a dynamic scheduling.

In one embodiment, the resource allocation comprises a Configured Grant.

In one embodiment, a Scheduling Request count of the first node U03 does not increase in the first time window.

In one embodiment, the Scheduling Request count comprises an SR-Count.

In one embodiment, the first signal is not used for determining the second time window.

In one embodiment, the first signal does not information used for determining the second time window.

In one embodiment, the second node N03 receives the first signal in step S7202.

In one embodiment, the second node N03 transmits the third signaling in step S7203.

In one embodiment, the first node U03 receives the third signaling in step S7103.

In one embodiment, the first node U03 transmits the third signal in step S7104.

In one embodiment, the second node N03 receives the third signal in step S7204, the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

In one embodiment, the K1 time window(s) corresponds (respectively correspond) to the K1 cell(s).

In one embodiment, the K1 time window(s) corresponds (respectively correspond) to the K1 beam(s).

In one embodiment, the K1 time window(s) corresponds (respectively correspond) to the K1 reference signal(s).

In one embodiment, the K1 time window(s) corresponds (respectively correspond) to the K1 antenna port(s).

In one embodiment, the K1 time window(s) corresponds (respectively correspond) to the K1 carrier(s).

In one embodiment, the K1 time window(s) corresponds (respectively correspond) to the K1 Synchronization Signal Block(s).

In one embodiment, the third signaling is used for indicating that whether the first node U03 is allowed to transmit a scheduling request signal for the first data radio bearer in the first time window in the K1 time-frequency resource set(s).

In one embodiment, the first node U03 transmits a scheduling request signal at a time outside the first time window in step S7105.

In one embodiment, the second node N03 receives a scheduling request signal in step S7205.

In one embodiment, the second node N03 transmits a resource allocation signaling in step S7206.

In one embodiment, the first node U03 receives a resource allocation signaling in step S7106.

Embodiment 8

Embodiment 8 illustrates a schematic diagram of K1 time-frequency resource set(s) according to one embodiment of the present disclosure, as shown in FIG. 8. In Embodiment 8, the K1 time-frequency resource set(s) comprises (comprise) at least one time-frequency resource set.

In one embodiment, the time-frequency resource set comprises at least one Resource Unit (RE).

In one embodiment, the K1 time-frequency resource set(s) comprises (comprise) time-frequency resource set 1.

In one embodiment, the K1 time-frequency resource sets comprise time-frequency resource set 1 and time-frequency resource set 2, which are orthogonal to each other.

In one embodiment, the K1 time-frequency resource set(s) belongs (belong) to a same cell.

In one embodiment, the K1 time-frequency resource sets belong to different cells.

In one embodiment, the K1 time-frequency resource set(s) belongs (respectively belong) to K1 cell(s).

In one embodiment, the K1 time-frequency resource set(s) belongs (respectively belong) to K1 beam(s) of a cell.

In one embodiment, the K1 time-frequency resource set(s) belongs (respectively belong) to K1 antenna port(s) of a cell.

In one embodiment, the K1 time-frequency resource set(s) is (are respectively) determined by K1 reference signal(s) of a cell.

In one embodiment, the third signaling carries information of the K1 time-frequency resource set(s).

In one embodiment, the third signal carries information of the K1 time-frequency resource set(s).

In one embodiment, the first time window and the second time window that are associated with the K1 time-frequency resource set(s) are used for random access.

In one embodiment, the K1 time-frequency resource set(s) is(are) associated with multiple cells, and a transmitter of the first signaling and a transmitter of a feedback signal of the first signal are not a same cell.

Embodiment 9

Embodiment 9 illustrates a schematic diagram of a first node and a second node according to one embodiment of the present disclosure, as shown in FIG. 9.

In one embodiment, the first node receives a first signaling and transmits the first signal to the second node.

In one embodiment, the first signal is used for random access.

In one embodiment, the first signal is used for determining the second time window.

In one embodiment, the second start time of the second time window is later than a time for transmitting the first signal and is later than a time for receiving the first signal.

In one embodiment, the second start time of the second time window is later than a reception time of the first signal plus a first offset.

In one embodiment, the first offset is greater than 1 subframe.

In one embodiment, the first offset is greater than 1 frame.

In one embodiment, the first offset is greater than 1 superframe.

In one embodiment, the first signal is used for indicating that the first node requests time-frequency resources in the second time window.

In one embodiment, the first signal is used for indicating that the first node requests to reserve time-frequency resources in the second time window.

In one embodiment, the first node requests a delayed resource allocation from the second node.

In one embodiment, the first node requests scheduling with different delayed times for different data to the second node.

In one embodiment, the first node enters into a DRX state before the second start time.

In one embodiment, the above method is advantageous in that start-up delay of data transmission is reduced.

Embodiment 10

Embodiment 10 illustrates a schematic diagram of a first node, a second node and a third node according to one embodiment of the present disclosure, as shown in FIG. 10.

In one embodiment, the first node receives a first signaling and transmits the first signal to the second node.

In one embodiment, the first signal is used for random access.

In one embodiment, the first signal is used for determining the second time window.

In one embodiment, the second start time of the second time window is later than a time for transmitting the first signal and a time for receiving the first signal.

In one embodiment, the second start time of the second time window is later than a time for receiving the first signal plus a first offset.

In one embodiment, the first offset is greater than 1 subframe.

In one embodiment, the first offset is greater than 1 frame.

In one embodiment, the first offset is greater than 1 superframe.

In one embodiment, the first signal is used for indicating that the first node requests time-frequency resources in the second time window.

In one embodiment, the first signal is used for indicating that the first node requests time-frequency resources belonging to the second node in the second time window.

In one embodiment, the first signal is used for indicating that the first node requests time-frequency resources for resource allocation through the second node in the second time window.

In one embodiment, the first signal is used for indicating that the first node requests time-frequency resources belonging to the third node in the second time window.

In one embodiment, the third node is a node other than the second node, and the third node is a serving cell.

In one embodiment, the third node is a cell in an SCG.

In one embodiment, the third node is an NTN cell.

In one embodiment, the third node is an LTE cell.

In one embodiment, the third node is an NR cell.

In one embodiment, the second node is a primary cell of the first node, and the first node reserves resources in the second time window to the third node through the second node.

In one embodiment, the first node requests a delayed resource allocation from the second node, and the delayed resource allocation is performed on time-frequency resources of the third node.

In one embodiment, the first node requests scheduling with different delayed times to the second node, and the different scheduling is performed on time-frequency resources of the third node.

In one embodiment, the first node enters into a DRX state before the second start time.

Embodiment 11

Embodiment 11 illustrates a schematic diagram of whether a first signaling is used for determining a first time window is used for determining whether a first signal is used for determining a second time window according to one embodiment of the present disclosure, as shown in FIG. 11.

In one embodiment, when the first signaling is used for determining the first time window, the first signal is not used for determining the second time window.

In one embodiment, when the first signaling is not used for determining the first time window, the first signal is used for determining the second time window.

In one embodiment, when the first signaling only comprises information outside the first time window, the first signal is used for determining the second time window.

In one embodiment, when the first signaling only comprises information outside the first time window, the first signal comprises information of the second time window.

In one embodiment, when the first signaling only comprises information outside the first time window, the first signal comprises the second start time and the second end time.

In one embodiment, when the first signaling only comprises information outside the first time window, the first signal comprises whether a scheduling request is performed in the second time window.

In one embodiment, when the first signaling comprises information of the first time window, the first signal only comprises information outside the second time window.

In one embodiment, when the first signaling comprises the first start time and the first end time of the first time window, the first signal only comprises information outside the second time window.

In one embodiment, when the first signaling comprises whether a scheduling request is allowed in the first time window, the first signal only comprises information outside the second time window.

Embodiment 12

Embodiment 12 illustrates a schematic diagram of whether a third signaling is used for determining a first time window is used for determining whether a third signal is used for determining a second time window according to one embodiment of the present disclosure, as shown in FIG. 12.

In one embodiment, when the third signaling is used for determining the first time window set, the third signal is not used for determining the second time window set.

In one embodiment, when the third signaling is not used for determining the first time window set, the third signal is used for determining the second time window set.

In one embodiment, when the third signaling only comprises information other than the first time window set, the third signal is used for determining the second time window set.

In one embodiment, when the third signaling only comprises information other than the first time window set, the third signal comprises information of the second time window set.

In one embodiment, when the third signaling only comprises information other than the first time window set, the third signal comprises a start time and an end time of each time window in the second time window set.

In one embodiment, when the third signaling only comprises information other than the first time window set, the third signal comprises whether a scheduling request is initiated in a time window belonging to the second time window set.

In one embodiment, when the third signaling comprises information of the first time window set, the third signal only comprises information other than the second time window set.

In one embodiment, when the third signaling comprises a start time and an end time of any time window in the first time window set, the third signal only comprises information other than the second time window set.

In one embodiment, when the third signaling comprises an indication of whether a scheduling request is allowed in a time window belonging to the first time window set, the third signal only comprises information other than the second time window set.

Embodiment 13

Embodiment 13 illustrates a structure block diagram of a processing device in a first node according to one embodiment of the present disclosure; as shown in FIG. 13. In FIG. 13, the first node's processing device 1300 comprises a first receiver 1301 and a first transmitter 1302. In Embodiment 13, the first receiver 1301 receives a first signaling; and
the first transmitter 1302 transmits a first signal;
in Embodiment 13, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time. In one embodiment, all sequences comprised in the first sequence set are associated with the first signal, and all time-frequency resources comprised in the first time-frequency resource set are associated with the first signal.

In one embodiment, the first time window and the second time window are associated with a PDU session.

In one embodiment, the first node automatically enters into a state other than an active state of a PDU session after the first end time and the second end time.

In one embodiment, the first receiver 1301 receives a second signaling;

the second signaling is used for indicating processing required by the first node after the first end time and the second end time.

In one embodiment, the first node automatically enters into a state other than a radio-resource control connected state after the first end time and the second end time.

In one embodiment, resources employed by the first node are released by a serving cell of the first node after the first end time and the second end time.

In one embodiment, the first signal is used for random access, the first signal comprises second information, the second information is used for indicating a cause of the random access, and the second information is related to the second time window.

In one embodiment, the second time window is related to a geographic position of the first node.

In one embodiment, the first node is prohibited to transmit scheduling request information in the first time window, and a Scheduling Request count of the first node is not increased in the first time window.

In one embodiment, the first receiver 1301 receives a third signaling; and the first transmitter 1302 transmits a third signal;

the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

In one embodiment, the first node is a UE.

In one embodiment, the first node is a terminal that supports large delay inequality.

In one embodiment, the first node is a terminal that supports NTN.

In one embodiment, the first node is an aircraft.

In one embodiment, the first node is a vehicle terminal.

In one embodiment, the first node is a relay.

In one embodiment, the first node is a vessel.

In one embodiment, the first node is an IoT terminal.

In one embodiment, the first node is an IIoT terminal.

In one embodiment, the first node is a device that supports transmission with low-latency and high-reliability.

In one embodiment, the first receiver 1301 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1302 comprises at least one of the antenna 452, the transmitter 454, the transmitting processor 468, the multi-antenna transmitting processor 457, the controller/processor 459, the memory 460 or the data source 467 in Embodiment 4.

Embodiment 14

Embodiment 14 illustrates a structure block diagram of a processing device in a second node according to one embodiment of the present disclosure; as shown in FIG. 14. In FIG. 14, the second node's processing device 1400 comprises a second transmitter 1401 and a second receiver 1402. In Embodiment 14, the second transmitter 1401 transmits a first signaling; and
the second receiver 1402 receives a first signal;
in Embodiment 14, whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

In one embodiment, the first time window and the second time window are both associated with a PDU session.

In one embodiment, the transmitter of the first signal automatically enters into a state other than an active state of a PDU session after the first end time and the second end time.

In one embodiment, the second transmitter 1401 transmits a second signaling;
  the second signaling is used for indicating processing required by the transmitter of the first signal after the first end time and the second end time.

In one embodiment, a transmitter of the first signal automatically enters into a state other than a radio-resource control connected state after the first end time and the second end time.

In one embodiment, resources employed by the transmitter of the first signal are released by a serving cell of the transmitter of the first signal after the first end time and the second end time.

In one embodiment, the first signal is used for random access, the first signal comprises second information, the second information is used for indicating a cause of the random access, and the second information is related to the second time window.

In one embodiment, the second time window is related to a geographic position of the transmitter of the first signal.

In one embodiment, the transmitter of the first signal is prohibited to transmit request scheduling information in the first time window, and a Scheduling Request count of the transmitter of the first signal is not increased in the first time window.

In one embodiment, the second transmitter 1401 transmits a third signaling; and the second receiver 1402 receives a third signal;
  the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

In one embodiment, the second node is a base station.
In one embodiment, the second node is a satellite.
In one embodiment, the second node is a UE.
In one embodiment, the second node is a gateway.
In one embodiment, the second node is a base station that supports large delay inequality.

In one embodiment, the second transmitter 1401 comprises at least one of the antenna 420, the transmitter 418, the transmitting processor 416, the multi-antenna transmitting processor 471, the controller/processor 475 or the memory 476 in Embodiment 4.

In one embodiment, the second receiver 1802 comprises at least one of the antenna 420, the receiver 418, the receiving processor 470, the multi-antenna receiving processor 472, the controller/processor 475 or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present disclosure includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communications, comprising:
  a first receiver, receiving a first signaling; and
  a first transmitter, transmitting a first signal;
  wherein whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to a Radio Resource Control (RRC) state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

2. The first node according to claim 1, wherein the first time window and the second time window are associated with a Protocol Data Unit (PDU) session.

3. The first node according to claim 2, wherein the first node automatically enters into a state other than a PDU session active state after the first end time and the second end time.

4. The first node according to claim 1, comprising:
the first receiver, receiving a second signaling;
the second signaling is used for indicating processing required by the first node after the first end time and the second end time.

5. The first node according to claim 1, wherein the first node automatically enters into a state other than an RRC connected state after the first end time and the second end time.

6. The first node according to claim 1, wherein resources employed by the first node are released by a serving cell of the first node after the first end time and the second end time.

7. The first node according to claim 1, wherein the first signal is used for random access, the first signal comprises second information, the second information is used for indicating a cause of the random access, and the second information is related to the second time window.

8. The first node according to claim 1, wherein the second time window is related to a geographic position of the first node.

9. The first node according to claim 1, wherein the first node is prohibited to transmit scheduling request information in the first time window, and a Scheduling Request count of the first node is not increased in the first time window.

10. The first node according to claim 1, comprising:
the first receiver, receiving a third signaling; and
the first transmitter, transmitting a third signal;
the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

11. A second node for wireless communications, comprising:
a second transmitter, transmitting a first signaling; and
a second receiver, receiving a first signal;
wherein whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

12. The second node according to claim 11, wherein the first time window and the second time window are associated with a PDU Session.

13. The second node according to claim 12, wherein the transmitter of the first signal automatically enters into a state other than a PDU Session active state after the first end time and the second end time.

14. The second node according to claim 11, comprising:
the second transmitter, transmitting a second signaling;
the second signaling is used for indicating processing required by the transmitter of the first signal after the first end time and the second end time.

15. The second node according to claim 11, wherein the first signal is used for random access, the first signal comprises second information, the second information is used for indicating a cause of the random access, and the second information is related to the second time window.

16. The second node according to claim 11, wherein the second time window is related to a geographic position of the transmitter of the first signal.

17. The second node according to claim 11, wherein the transmitter of the first signal is prohibited to transmit scheduling request information in the first time window, and a Scheduling Request count of the transmitter of the first signal is not increased in the first time window.

18. The second node according to claim 11, comprising:
the second transmitter, transmitting a third signaling; and
the second receiver, receiving a third signal;
the third signaling comprises a first time window set, whether the third signaling is used for determining a first time window set is used for determining whether the third signal is used for determining a second time window set, the first time window set and the second time window set comprise K1 time window(s), the K1 time window(s) is(are) associated with K1 time-frequency resource set(s), K1 being a positive integer.

19. A method in a first node for wireless communications, comprising:

receiving a first signaling; and transmitting a first signal;

wherein whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether the first node requests scheduling for the first data radio bearer group is related to an RRC state of the first node, the first time window and the second time window; whether a serving cell of the first node allocates resources for the first data radio bearer group is related to an RRC state of the first node, the first time window and the second time window; in a communication process, the first node requests scheduling for the first data radio bearer group only within or outside the first time window and the second time window; a serving cell of the first node allocates resources for the first data radio bearer group only within or outside the first time window and the second time window; lengths of the first time window and the second time window are greater than a first time length, and the first start time and the second start time are equal to a first specific time.

20. A method in a second node for wireless communications, comprising:

transmitting a first signaling; and receiving a first signal;

wherein whether the first signaling is used for determining a first time window is used for determining whether the first signal is used for determining a second time window, a start time of the first time window in time domain is a first start time and an end time of the first time window in time domain is a first end time, a start time of a second time window in time domain is a second start time and an end time of the second time window in time domain is a second end time, and neither the first end time nor the second end time is equal to an infinity; a first data radio bearer group is associated with the first time window and the second time window; whether a transmitter of a first signal requests scheduling for the first data radio bearer group is related to an RRC state of the transmitter of the first signal, the first time window and the second time window; whether a serving cell of the transmitter of the first signal allocates resources for the first data radio bearer group is related to an RRC state of the transmitter of the first signal, the first time window and the second time window; in a communication process, the transmitter of the first signal requests scheduling for the first data radio bearer group only within or outside the first time window and the second time window; a serving cell of the transmitter of the first signal allocates resources for the first data radio bearer group only within or outside the first time window and the second time window; lengths of the first time window and the second time window are greater than a first time length, and the first start time and the second start time are equal to a first specific time.

* * * * *